US007038996B2

(12) United States Patent
Binnig et al.

(10) Patent No.: US 7,038,996 B2
(45) Date of Patent: May 2, 2006

(54) METHOD AND APPARATUS FOR READING AN ARRAY OF THERMAL RESISTANCE SENSORS

(75) Inventors: Gerd K. Binnig, Wollerau (CH); Urs T. Duerig, Rueschlikon (CH)

(73) Assignee: International Business Machines Corp., Armonk, NY (US)

( * ) Notice: Subject to any disclaimer, the term of this patent is extended or adjusted under 35 U.S.C. 154(b) by 340 days.

(21) Appl. No.: 10/438,405

(22) Filed: May 15, 2003

(65) Prior Publication Data
US 2004/0228258 A1 Nov. 18, 2004

(51) Int. Cl.
*G11B 9/00* (2006.01)

(52) U.S. Cl. ............ 369/126; 369/101; 369/154; 374/164; 702/133

(58) Field of Classification Search ........... 369/126, 369/44.28, 47.1, 154, 101; 977/DIG. 1; 250/306, 307; 702/30, 31, 99, 133; 374/10, 374/43, 164, 173, 183; 360/65, 66, 25, 31
See application file for complete search history.

(56) References Cited

U.S. PATENT DOCUMENTS

| 5,137,370 A * | 8/1992 | McCulloch et al. | 374/173 |
| 5,248,199 A * | 9/1993 | Reading | 374/11 |
| 5,856,967 A * | 1/1999 | Mamin et al. | 369/126 |
| 6,423,967 B1 * | 7/2002 | Shido et al. | 250/306 |
| 6,473,251 B1 * | 10/2002 | Patti et al. | 360/25 |
| 6,491,425 B1 * | 12/2002 | Hammiche et al. | 374/43 |
| 6,507,552 B1 * | 1/2003 | Gibson | 369/126 |
| 6,535,824 B1 * | 3/2003 | Mansky et al. | 702/30 |
| 6,665,258 B1 * | 12/2003 | Dietzel et al. | 369/126 |
| 6,883,368 B1 * | 4/2005 | Smith et al. | 73/105 |

* cited by examiner

*Primary Examiner*—William Korzuch
*Assistant Examiner*—Kim-Kwok Chu
(74) *Attorney, Agent, or Firm*—Richard M. Goldman

(57) ABSTRACT

Described is a method for reading an array of sensors having a set of row conductors each connected to the sensors in a corresponding row of the array and a set of column conductors each connected to the sensors in a corresponding column of the array such that each sensor is connected between a row conductor and a column conductor. The method comprises: for each row of sensors in the array, performing a read cycle comprising applying an activation pulse to the corresponding row conductor to activate the sensors in the row, applying a reading pulse to the row conductor on expiry of a predetermined time interval from an edge of the activation pulse, and during the reading pulse, detecting, for each sensor in the row, a value dependent on a variable characteristic of that sensor. The read cycle for at least one row is commenced during the predetermined time interval of the read cycle for another row. In a preferred example described in detail, the sensors are thermal resistance sensors, the activation pulse is a heating pulse to heat the sensors, and the variable characteristic is resistance.

23 Claims, 9 Drawing Sheets

METHOD AND APPARATUS FOR READING AN ARRAY OF THERMAL RESISTANCE SENSORS

The present invention relates to a method and apparatus for reading an array of thermal resistance sensors, the array having a set of row conductors each connected to the sensors in a corresponding row of the array and a set of column conductors each connected to the sensors in a corresponding column of the array such that each sensor is connected between a row conductor and a column conductor.

Such arrays may be employed in the detection of the topography of a surface in applications such as surface visualization and data storage. In the data storage application, data recorded in a surface topography is read by moving a thermal resistance sensor over the surface and detecting changes in thermal conductance between the sensor and the surface as the distance between the sensor and the surface varies.

An example of a such a data storage application is described in "The "Millipede"—More than one thousand tips for future AFM data storage", P. Vettiger et al, *IBM Journal of Research and Development*. Vol. 44 No. 3, May 2000. As described therein, this device comprises a two dimensional array of cantilever sensors fabricated on a silicon substrate. Each cantilever is attached at one end to the substrate. The other end of each cantilever carries a resistive heater element and an outward facing tip. Each cantilever is addressable via row and column conductors. The row and column conductors permit selective passage of electrical current through each cantilever to heat the heating element thereon.

In both reading and writing operations, the tips of the array are brought into contact with and moved relative to a storage medium comprising a polymer film coating a plane substrate.

Data is written to the storage medium by a combination of applying a local force to the polymer layer via each tip and selectively heating each tip via application of data signals through the corresponding row and column conductors to a level sufficient to locally melt the polymer layer, thereby causing the tip to penetrate the surface of polymer layer and leave an indentation.

Each heating element also provides a thermal read back sensor because it has a resistance which is dependent on temperature. For data reading operations, a heating signal is applied sequentially to each row in the array. The heating signal heats all heating elements in the selected row, but now to a temperature which is insufficient to melt the polymer film. The thermal conductance between the heating elements and the storage medium varies according to distance between the heating elements and the storage medium. When the tips move into bit indentations as the array is scanned across the storage medium, the distances between the heating elements and the storage medium reduce. The medium between the heating elements and the storage medium transfers heat between the heating elements and the storage medium. Heat transfer between each heating element and the storage medium becomes more efficient when the associated tip moves in an indentation. The temperature and therefore the resistance of the heating element therefore reduces. Changes in temperature of the continuously heated heating elements of each row can be monitored in parallel, thereby facilitating detection of recorded bits.

As in any sensor system, the rate at which data can be read from the array is limited by noise. Johnson noise, 1/f noise, media noise, system noise, and electronic interference are all examples of bandwidth limiting noise present in the system. Johnson noise and 1/f noise are well-known in the art. Media noise is produced by imperfections in the surface of the storage medium. Systematic noise is produced by variations between the resistances of the heating elements in the array.

Taking into account the aforementioned noise considerations, a theoretical maximum data rate can be calculated. A challenge for the system designer is to get as close to the theoretical limit as possible. However, the approach to the theoretical limit is hampered by various practical problems. One problem is that only one row of the array can be read at a time. Another problem is that, in order to read a row, the heaters of the row have to be heated. Each heater in the array has a thermal response time dependent by physical characteristics of the fabrication materials employed.

In accordance with the present invention, there is now provided a method for reading an array of sensors, the array having a set of row conductors each connected to the sensors in a corresponding row of the array and a set of column conductors each connected to the sensors in a corresponding column of the array such that each sensor is connected between a row conductor and a column conductor, the method comprising: for each row of sensors in the array, performing a read cycle comprising applying an activation pulse to the corresponding row conductor to activate the sensors in the row, applying a reading pulse to the row conductor on expiry of a predetermined time interval from an edge of the activation pulse, and during the reading pulse, detecting, for each sensor in the row, a value dependent on a variable characteristic of that sensor; wherein the read cycle for at least one row is commenced during the predetermined time interval of the read cycle for another row.

It should be noted that the terms "row" and "column" are used interchangeably herein.

In preferred embodiments of the present invention, the sensors are thermal resistance sensors, the activation pulse is a heating pulse to heat the sensors, and the variable characteristic is resistance.

The read cycles for a plurality of rows may be commenced during the predetermined time interval of the read cycle for another row. In the interests of simplicity in implementation, the read cycles are preferably initiated in row order.

The reading pulses may be applied alternately with the heating pulses. Alternatively a group of the reading pulses may be applied alternately with a corresponding group of the activation pulses.

In preferred embodiments of the present invention, the difference between values detected during successive read cycles may be determined for each sensor in row in the interests of minimizing high frequency offsets and reducing dynamic range requirements.

In particularly preferred embodiments of the present invention, to increasing the speed of read operations, the amplitude of the heating pulse is greater than the amplitude of the reading pulse and the duration of the heating pulse is less than the duration of the reading pulse.

Viewing the present invention from another aspect, there is now provided apparatus for reading an array of sensors, the array having a set of row conductors each connected to the sensors in a corresponding row of the array and a set of column conductors each connected to the sensors in a corresponding column of the array such that each sensor is connected between a row conductor and a column conductor, the apparatus comprising: for each row of sensors in the array, a signal source for, during a read cycle, applying an activation pulse to the corresponding row conductor to activate the sensors in the row and applying a reading pulse to the row conductor on expiry of a predetermined time interval from an edge of the activation pulse; and, for each sensor in the row, a detector connected to the corresponding column conductor for detecting, during the reading pulse, a value dependent on a variable characteristic of that sensor; wherein the read cycle for at least one row is commenced during the predetermined time interval of the read cycle for another row. As indicated earlier, in preferred embodiments of the present invention, the sensors are thermal resistance sensors, the activation pulse is a heating pulse to heat the sensors, and the variable characteristic is resistance.

The read cycles for a plurality of rows are preferably commenced during the predetermined time interval of the read cycle for another row. The signal source preferably initiates the read cycles in row order in the interests of simplicity of implementation. The signal source may apply the reading pulses alternately with the heating pulses. Alternatively, the signal source may apply a group of the reading pulses alternately with a corresponding group of the heating pulses.

In the interests of minimizing high frequency offsets and reducing dynamic range requirements, the detector may comprise a subtracter for determining, for each sensor in the row, the difference between values detected during successive read cycles. The detector preferably comprises a memory for storing the values detected during successive read cycles. The memory may comprise an analogue integrator circuit. Alternatively, the memory may comprise a lookup table.

In a preferred embodiment of the present invention, the detector comprises a balancing voltage source connected to the corresponding column conductor via a sense resistor and a sense amplifier for detecting voltage drop across the sense resistor. The detector may comprises an integrator for storing the output of the sense amplifier. The detector may also comprise an analogue to digital convertor for generating a digital output indicative of the value stored in the integrator and a memory for storing the digital value. In a particularly preferred embodiment of the present invention, the detector comprises a feedback loop for varying the output of the balancing voltage source in dependence on the output of the analogue to digital convertor.

The present invention extends to a data storage system comprising: an array of thermal resistance sensors, the array having a set of row conductors each connected to the sensors in a corresponding row of the array and a set of column conductors each connected to the sensors in a corresponding column of the array such that each sensor is connected between a row conductor and a column conductor; and, apparatus as hereinbefore described for reading the array. A data storage system may include a data storage medium facing the array. Alternatively, the data storage may be supplied separately.

Preferred embodiments of the present invention will now be described, by way of example only, with reference to the accompanying drawings, in which.

Figure 1:
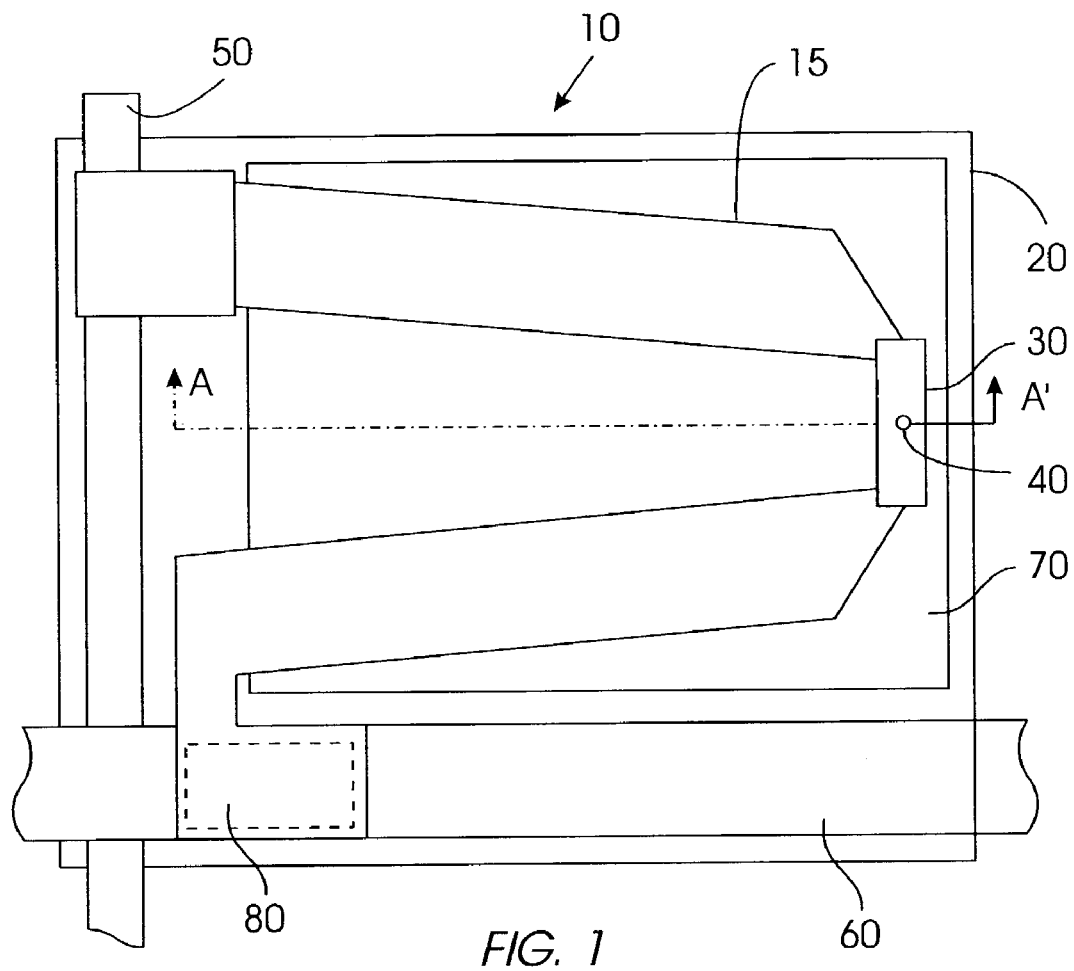
FIG. 1 is a plan view of a sensor for a data storage system embodying the present invention.

Referring first to FIG. 1, an example of a data storage system embodying the present invention comprises a two dimensional array of cantilever sensors 10 disposed on a substrate 20. Row conductors 60 and column conductors 50 are also disposed on the substrate. Each sensor 10 is addressed by a different combination of a row conductor 60 and a column conductor 50. Each sensor 10 comprises a U-shaped silicon cantilever 15 of a length in the region of 70 um and thickness in the region of um. Limbs of the cantilever 15 are fixed, at their distal ends, to a silicon substrate 20. The apex of the cantilever 15 resides in a recess 70 formed in the substrate 20 and has freedom for movement in a direction normal to the substrate 20. The cantilever 15 carries, at its apex, a resistive heater element 30 and a silicon tip 40 facing away from the substrate 20. The limbs of the cantilever 15 are highly doped to improve electrical conductance. The heater element 30 is formed by doping the apex of the cantilever 15 to a lesser extent, thereby introducing a region of increased electrical resistance to current flow through the cantilever 15. One of the limbs of the cantilever 15 is connected to a row conductor 60 via an intermediate diode 80. The other limb of the cantilever 15 is connected to a column conductor 50. Row conductor 60, column conductor 70, and diode 80 are also disposed on the substrate 20. The cantilever 15 is pre-stressed to resiliently bias the tip away from the substrate 20.

Figure 2:
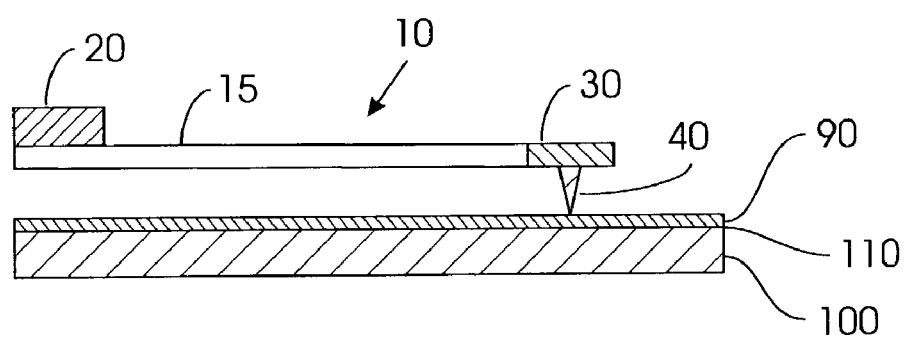
FIG. 2 is a cross-sectional view of the sensor when viewed in the direction of arrows A–A'.

Referring now to FIG. 2, the tip 40 is urged against to a planar storage medium in the form of a polymer layer 90 such as a film of polymethylmethacrylate (PMMA) of a thickness in the region of 40 nm. The polymer layer 90 is carried by a silicon substrate 100. A buffer layer 110 of cross-linked photo-resist such as SU-8 of a thickness in the region of 70 nm is disposed between the polymer layer 90 and the substrate 70. In both reading and writing operations, the tip 40 of the array is across the surface of the storage medium.

Data is written to the storage medium by a combination of applying a local force to the polymer layer 90 via the tip and heating the tip 40 by passing a write current through the cantilever 15 from the corresponding row conductor 60 to the corresponding column conductor 50. Passage of current through the cantilever 15 causes the heater element 30 to heat up. Heat energy is passed from the heater element 30 into the tip 40 via thermal conductance. The write current is selected to heat the tip 40 to a level sufficient to locally melt the polymer layer, thereby causing the tip 40 to penetrate the surface of the polymer layer and leave an indentation 120 of a diameter in the region of 40 nm. By way of example, it has been found that local melting of a PMMA film can be achieved by heating the tip 40 to a temperature of the order of 700 degrees centigrade. The buffer layer 110 has a higher melting point than the PMMA film 90 and therefore acts as a penetration stop to prevent abrading of the tip 40 against the substrate 90.

The heating element 30 also provides a thermal read back sensor because it has a resistance which is dependent on temperature. For data reading operations, a heating current is passed though the cantilever 15 from the corresponding row conductor 60 to the corresponding column conductor 50. Accordingly, the heating element 40 is again heated, but now to a temperature which is insufficient to melt the polymer layer 90. Reading temperatures of the order of 400 degrees centigrade are, for example, insufficient to melt a PMMA film, but nevertheless provide acceptable reading performance. The thermal conductance between the heating element 30 and the polymer layer 90 varies according to distance between the heating element and the polymer layer 90. When the tip 40 moves into a bit indentation 120 as the array is scanned across the PMMA film 90, the distances between the heating element 30 and the polymer layer 90 reduce. The medium between the heating element 30 and the polymer layer 90 transfers heat between the heating element 40 and the polymer layer 90. Heat transfer between the heating element 30 and the polymer layer 90 more efficient when the tip 40 moves in the indentation 120. The temperature and therefore the resistance of the heating element 30 therefore reduces. Changes in temperature of the continuously heated heating element 30 row can be monitored in parallel, thereby facilitating detection of recorded bits.

The aforementioned heating current is produced by applying a heating voltage pulse to the corresponding row conductor 60. Accordingly, a heating current flows through each sensor 10 connected to the row conductor 60 to which the heating voltage pulse is applied. All the heating elements 30 in the corresponding row of the array are therefore heated. Recorded data is then read out from in parallel from the heated row of sensors 10. Each row of the array is thus read sequentially according to a multiplexing scheme.

As mentioned earlier, noise considerations lead to a theoretical maximum rate at which data can be read from the array. Calculations suggest that a net data rate of 30 Mbits/sec may be realized. It would desirable to reach such a data rate. For an array of 1024 sensors 10 arranged in a 32×32 matrix, each sensor would need to deliver about 30 kbits/sec to achieve the desired rate of 30 Mbits/sec from the entire array. This requires reading of each sensor 10 30000 times per second. However, only one row of 32 sensors 10 can be read at a time and there are 32 rows in this example. Therefore, the desired net data rate of 30 Mbits/sec requires reading of all 32 rows 30000 times per second, thereby delivering about 1 million parallel row readings per second. Therefore, to achieve the desired net data rate of 30 Mbits/sec, a row multiplexing time interval, $t_m$ of 1 μs is required. However, the sensors 10 typically have a thermal response time in the region of 10 μs. Thus, the sensor 10 cannot reach thermal equilbrium during $t_m$.

Figure 3:
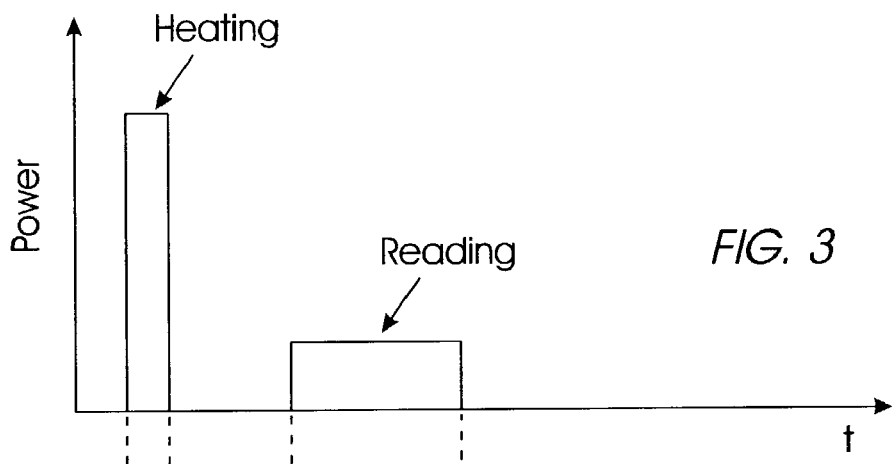
FIG. 3 is a graph of power supplied to the sensor during a read cycle.
Figure 4:
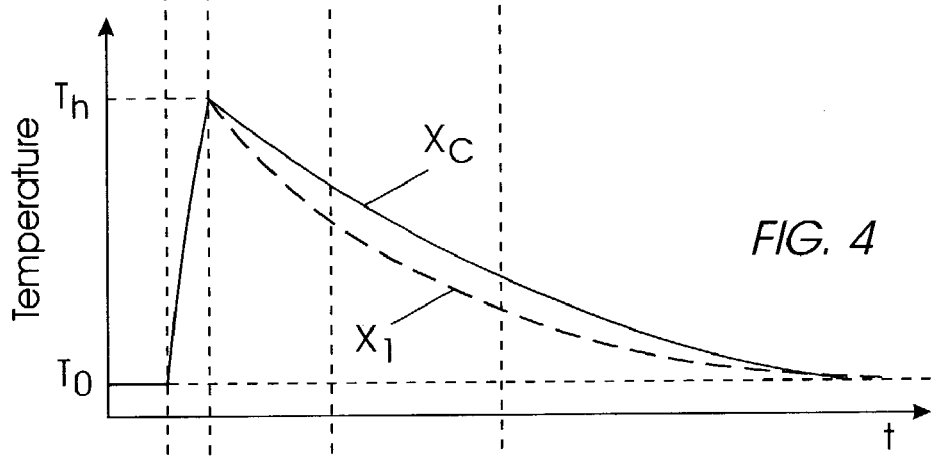
FIG. 4 is a graph of temperature of the sensor during a read cycle.
Figure 5:
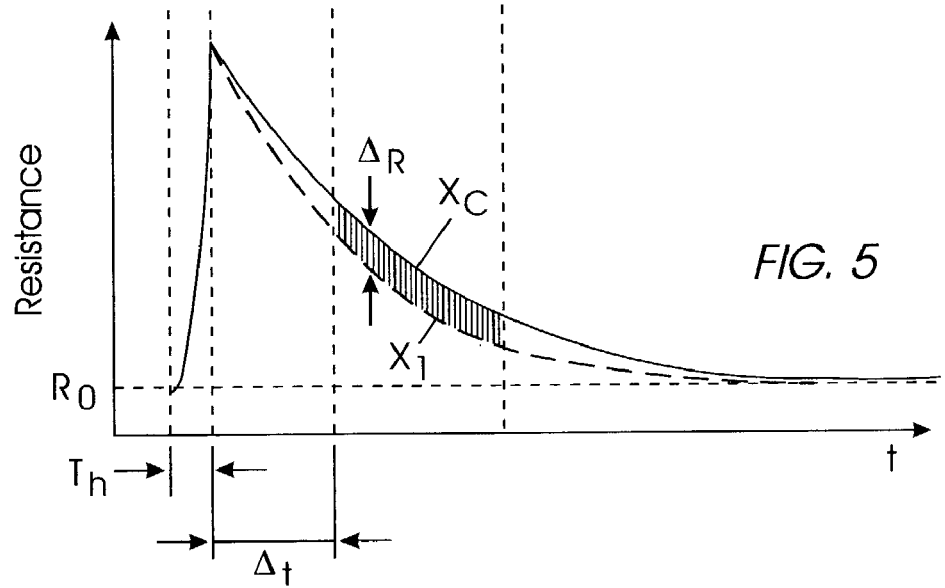
FIG. 5 is a graph of resistance of the sensor during a read cycle.

Referring to FIG. 3, in embodiments of the present invention, this problem is overcome by a dynamic read out technique. According to this technique, each row of sensors is read in a two step read cycle. In a first step of the cycle, a heating pulse is applied to the sensor 10. Referring to FIG. 4, the heating pulse imparts sufficient energy to heat the heating element 30 up to or just above the nominal readout temperature. With reference now to FIG. 5, in a second step of the cycle, a reading pulse is applied to the sensor 10 at a time delay Δt after the heating pulse. The resistance of the sensor 10 is measured based on the reading pulse. Both the first and second steps can be performed well within the thermal relaxation time.

In particularly preferred embodiments of the present invention, the time delay between heating and reading is of the order of the thermal relaxation time for maximum sensitivity. As indicated earlier, each row of the array is read sequentially according to a multiplexing scheme. The multiplexing scheme permits implementation of the dynamic read out technique in an interleaved mode. The interleaved mode allows access to stored data at a much higher net rate without exceeding the thermal time constant.

Figure 6:
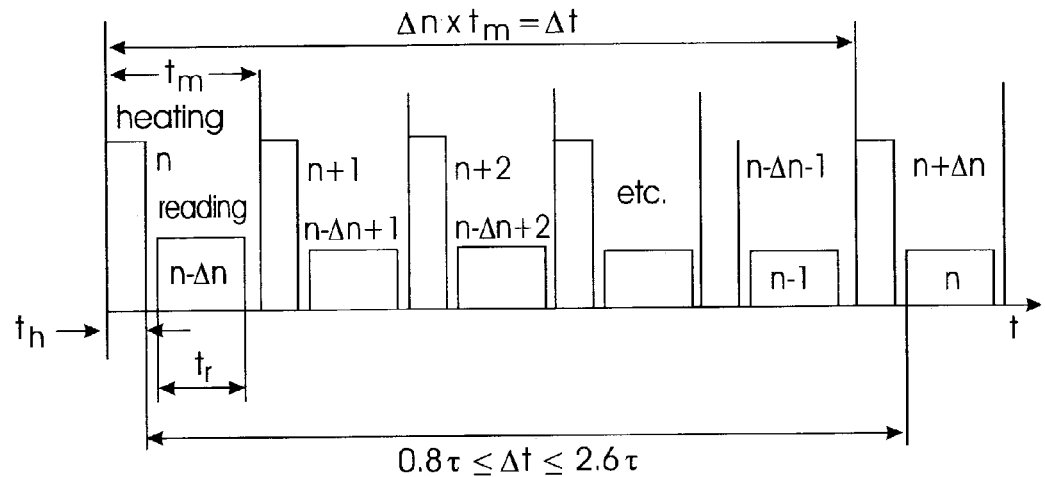
FIG. 6 is a graph of power supplied to sensors of the data storage system during a read cycle for one of the sensors in an interleaved mode of operation.

Referring to FIG. 6, in a preferred embodiment of the present invention the heating is offset relative to the reading by a fixed number Δn of multiplexing steps. Consider an arbitrary multiplexing step, n. First, a heating pulse is applied to the $n^{th}$ row during a time interval $t_h$. Then the n−Δn row, which was heated Δn multiplexing steps earlier is accessed fro reading during a time interval $t_r$. Next, the n+1 row is heated and the n−Δn+1 row is read. This process continues sequentially tthrough the rows. Finally, Δn multiplexing steps later, the $n^{th}$ row is ready for reading, after a time delay of Δt≈Δn$t_m$, which is preferably of the order of between 0.8 T and 2.5 T, where T is the thermal relaxation time. Thus, the net data rate is increased Δn+1 times with respect to the thermal rate. Note that Δn cannot be larger than N−1, where N is the number steps in the multiplexing cycle. Note also that the total time required for heating and reading should be no greater than the multiplexing time interval $t_m$.

Figure 7:
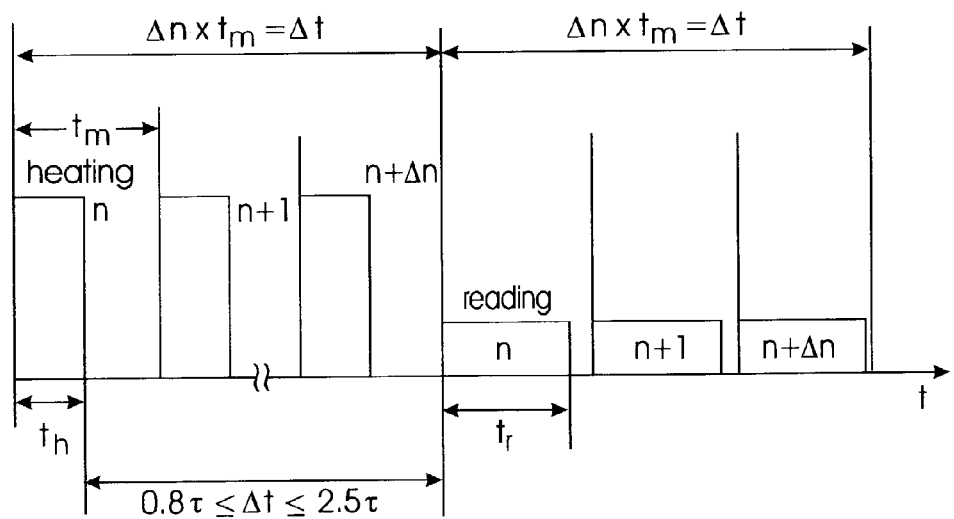
FIG. 7 is a graph of power supplied to sensors of the data storage system during a read cycle for one of the sensors in block read mode of operation

With reference to FIG. 7, in another embodiment of the present invention, heating and reading are performed in two successive blocks each comprising Δn+1 multiplexing steps. This arrangement is advantageously less complex to implement. However, this arrangement is also less efficient unless $t_h$ and $t_r$ are of similar lengths.

Figure 8:
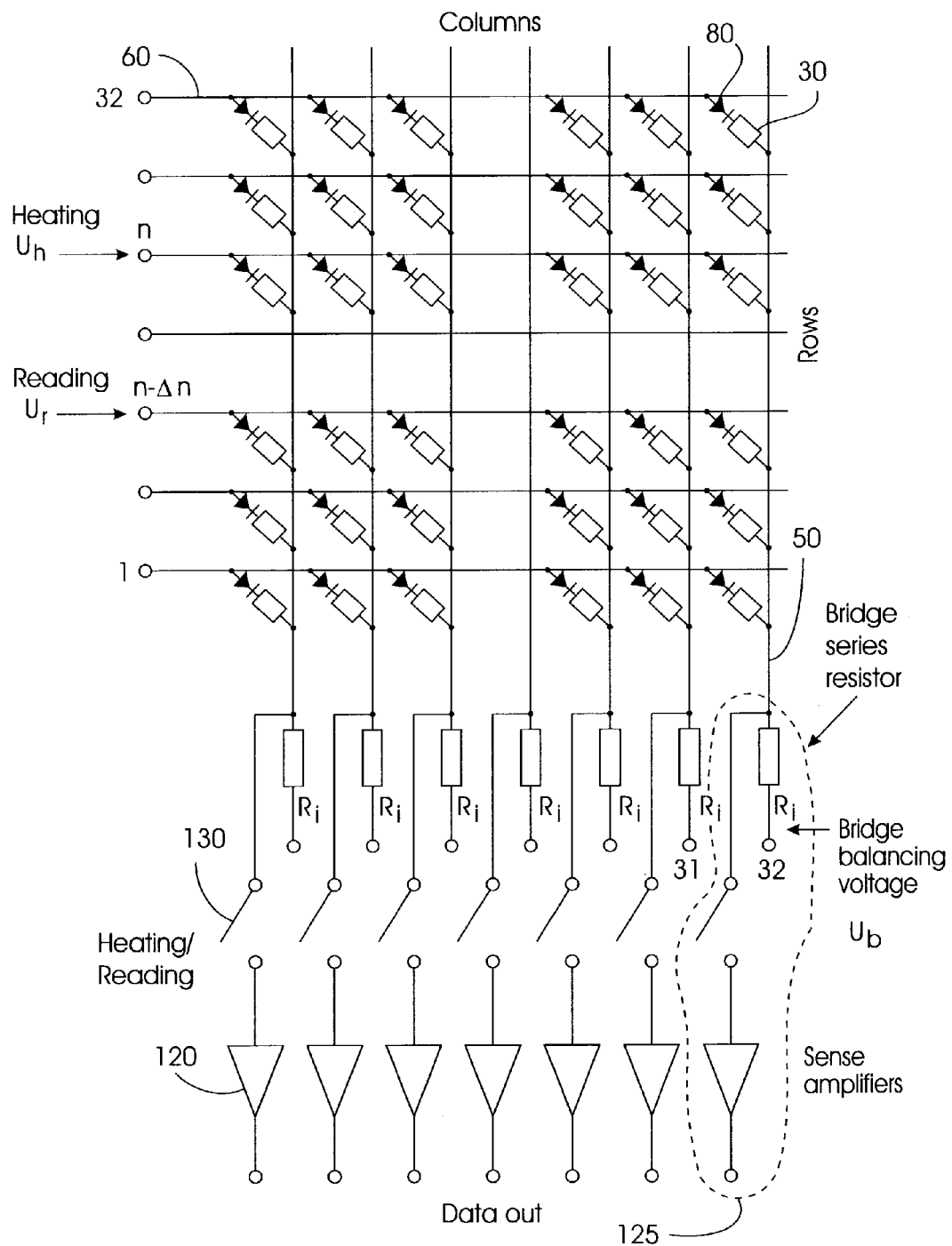
FIG. 8 is a simplified circuit diagram of a data storage system embodying the present invention.

Turning now to FIG. 8, as mentioned earlier, an example of a data storage system embodying the present invention comprises a two dimensional array of sensors 10 and a matrix of a row conductors 60 and column conductors 50. Each sensor 10 is addressed by a different combination of a row conductor 60 and a column conductor 50. More specifically, each sensor 10 interconnects a different combination of a row conductor 60 and a column conductor 50. Each sensor 10 may be represented a nonlinear resistance $R_s$ in series with the aforementioned diode 80. The resistance $R_s$ is representative of the resistive heating element 30. The resistance $R_s$ and the diode 80 interconnect a corresponding pair of row and column conductors. The diode 80 is forward biased in the direction of current flow from the corresponding row conductor 60 to the corresponding column conductor 50. The diodes 80 isolate the sensors 10 in the array from each other in the interests of suppressing cross talk. The circuit topology of the array is generally known as a crossbar topology. As mentioned earlier, rows of sensors 10 are accessed sequentially one at a time with all columns are accessed simultaneously in parallel. Each column conductor 50 is connected to a separate detector 125. Each detector 125 comprises a bridge balancing voltage source $U_b$ coupled to the corresponding column conductor 50 via a bridge series resistor $R_i$. The corresponding column conductor 50 is also selectively connectable to the input of a sense amplifier 120 via a switch 130. The sense amplifier 120 has a high impedance input to minimize current flow out of the bridge.

In operation, a read voltage pulse is applied to a selected row conductor 60 connected to the row of sensors 10 to be interrogated. Current flows from the selected row conductor 60 through the diode and resistance $R_s$ of each sensor 10 in the row to the corresponding balancing voltage source $U_b$ via the associated column conductor 50 and bridge resistor $R_i$. As mentioned earlier, the current flow through each sensor 10 during a read operation varies according to the sensor tip 40 detecting a logical "1" or a logical "0" because the resistance $R_s$ of the sensor 10 varies between detection of a logical "1" and detection of a logical "0". Accordingly the voltage dropped across the bridge resistor $R_i$ varies between detection of a logical "1" and detection of a logical "0". This voltage drop is detected by the corresponding sense amplifier 120.

The bridge configuration of the read out channel circuit advantageously limits noise degradation of signal read by the array. In addition, the series resistors $R_i$ help to stabilize the operating point of the corresponding sensors 10. Specifically, the series resistors $R_i$ provide current limiting, thereby preventing damage to the sensors in the event of thermal runaway instabilities in the sensor 10. Such instabilities may occur because the sensors 10 exhibit a negative resistance characteristic at relatively high temperatures. It is desirable for bridge resistor $R_i$ to match the effective resistance $R_s$ of the sensor 10 under heating conditions. In a 32×32 array, it is found that 0.25 mA<$I_n$<0.35 mA and 3V<$U_n$<9V yields $R_i$ in the range 12 kohm<$R_i$<25 kohm.

As indicated earlier with reference to FIGS. 6 and 7, dynamic sensing can be performed either in an interleaved mode or in a block mode. Interleaved mode advantageously provides maximum flexibility in read out bandwidth. Block mode advantageously provides higher speed reading.

In the interleaved mode, heating of row n and reading of row n−Δn are performed in a single multiplexing step interval $t_m$. For a 32×32 matrix as hereinbefore described, $t_m$ is of the order of 1 μs. Correspondingly, lower bounds for the heating reading pulse widths are $t_h$>0.5 μs and $t_r$≧0.5 μs respectively. The thermal time constant of typically T=10 μs represents an upper bound for the heating pulse width $t_h$<10 μs. It is found that acceptable sensing efficiency may be obtained in a time interval of the order of 3×T. Hence, a corresponding upper bound for the read pulse width is $t_r$<30 μs. Values for the offset parameter should cover the entire range from Δn=0 corresponding to heating and reading of the same row in one multiplexing step to Δn=31 corresponding to high speed reading at the upper speed limit.

In the block mode, rows n−Δn . . . n are heated during a first block of Δn+1 multiplexing steps. Reading of the identical sequence of rows is performed during the subsequent Δn+1 multiplexing steps. This method is not efficient unless heating and reading pulse widths, $t_h$ and $t_r$, are of comparable length. However, the switching rate between heating and reading potentials is reduced by a factor of Δn+1 which is advantageous at higher multiplexing speeds. It is desirable for $t_h$, $t_r$, and Δn to cover the same range as for the interleaved mode, and for $t_h$≦$t_m$ and $t_r$≦$t_m$. Note that, in block mode reading, the number of multiplexing steps in a complete cycle is twice the number of rows.

During both heating and reading operations, only the row selected for heating or reading is connected to a voltage source. All other rows remain floating. In particularly preferred embodiments of the present invention, heating and reading potentials are adjustable within a range of 0V to 12V. Normally, the reading voltage will be of the order of between 1V and 2V. However, for heating an operating point close to thermal resistance instability may selected. Because of the relatively low duty cycle $t_h$/T of pulsed heating, peak currents of up to 10 mA per sensor 10 can occur. Therefore, it is desirable for the heating voltage source to provide at least 300 mA of current in a pulsed mode for a 32×32 matrix of sensors 10.

It is desirable to operate the bridges formed by the sensor resistances $R_s$ and the series resistors $R_i$ in a balanced mode, in which the sense lines are kept at virtual earth, with a view to minimizing capacitive loading effects. This demands that the bridge balancing voltage $U_b$ is adjusted accordingly. Therefore, respective values should be stored for each sensor 10 in, for example, a look up table and independent voltage sources should be provided for each column. A problem with this arrangement is that noise originating in the bridge voltage sources is not correlated and hence builds up incoherently on the column conductors 50. However, this technique reduces the dynamic range providing acceptable reading by several orders of magnitude. It can be shown that, in the 32×32 array hereinbefore described, N bits of conversion accuracy is sufficient provided that the balancing voltage is tracked with 17-N bit resolution. In preferred embodiments of the present invention, N≧4.

Because of the aforementioned noise considerations associated with independent bridging voltage sources, it is preferable to derive the balancing voltage $U_b$ from the row voltage. In a preferred embodiment of the present invention, the bridges are balanced individually via programmable gain amplifiers.

In an embodiment of the present invention, the sense amplifiers each measure resistance variations typically of the order of $\Delta R/R \approx 10^{-4}$ with 4 bit resolution in a time multiplexed, sampled environment. The sampling interval $t_r$ is between 0.5 μs and 30 μs with a minimum dwell time of 0.5 μs at a maximum multiplexing rate of 1 MHz.

Figure 9:
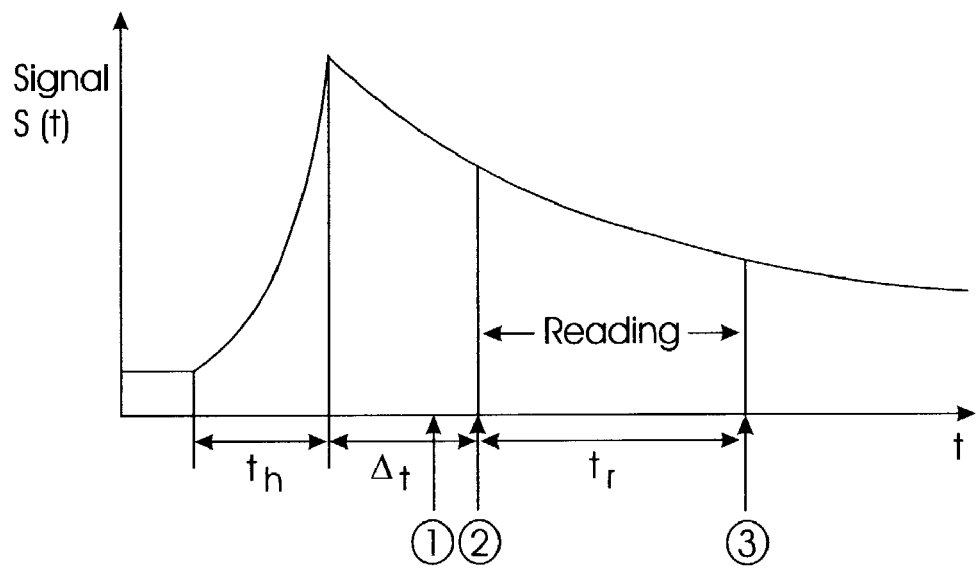
FIG. 9 is a graph of a read out signal detected from a sensor of the data storage system during a read cycle.
Figure 10:
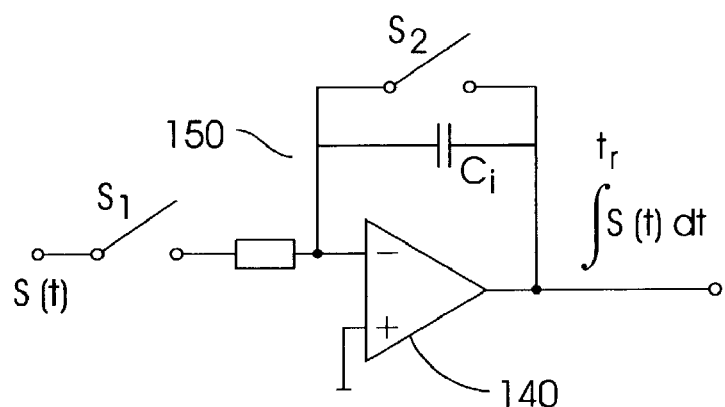
FIG. 10 is a circuit diagram of part of a detector for the data storage system.

Referring to FIGS. 9 and 10 in combination, in a preferred embodiment of the present invention, each detector 125 comprises a boxcar integrator 150 including a virtual earth feedback amplifier having an integrating capacitor $C_i$ in its feedback loop, and switches $S_1$ and $S_2$ deals with the transient nature of the read signals with acceptable efficiency. At point 1, the integrator 150 is reset by closing switch $S_2$, thereby discharging capacitor $C_i$. After a period $t_r$, switch $S_1$ is opened thereby storing the result of the integration in capacitor $C_i$ and providing the result at the output.

Figure 11:
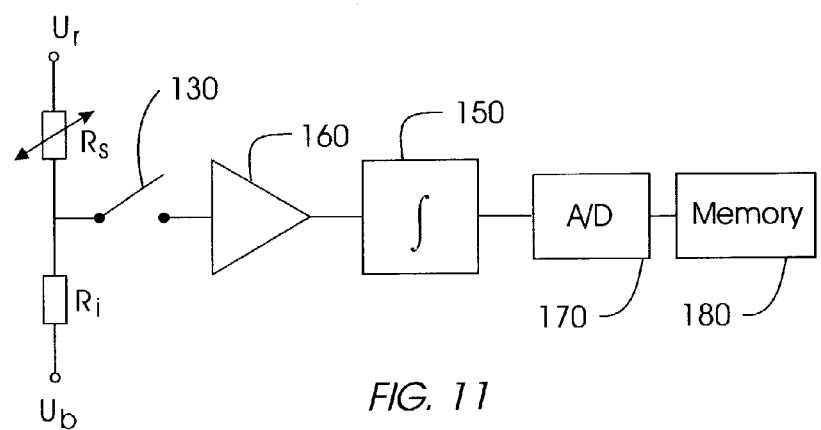
FIG. 11 is a block diagram of a detector for the data storage system.

Referring to FIG. 11, in a particularly preferred embodiment of the present invention, each detector 125 comprises a low noise amplifier 160 having a high impedance input connectable to the node between series resistor $R_i$ and the sensor resistance $R_s$ of the bridge. To avoid switching transients, the amplifier 160 is preferably disconnected from the bridge during heating via a high speed switch 130 as hereinbefore described with reference to FIG. 8. The output from the amplifier 160 is buffered the boxcar integrator 160 hereinbefore described and subsequently digitized by an analogue to digital (A/D) convertor 170. The digitized output of the A/D convertor 170 is stored in a buffer memory 180. For a 32×32 matrix of sensors 10, the complete matrix is accessed by operating 32 such amplifier circuits in parallel: one allocated to each column conductor 50. A problem associated with this arrangement is the relatively large dynamic range of 17 bits demanded in the A/D convertor 170 for acceptable read out. This problem is amplified by requiring completion of the A/D conversion before the next row is read. This time interval cannot be substantially longer than $t_h$, which can be as short as 0.5 µs at the maximum multiplexing rate for a 32×32 array Referring to FIG. 12, in a modification to the detector 125 hereinbefore described with reference to FIG. 11, the aforementioned dynamic range problem is addressed by providing two alternately activated boxcar integrators, 151 and 152, for each sensor 10 in column. Suppose row n is addressed. Accordingly, resistance $R_s$ of the $n^{th}$ sensor 10 in the column is detected. Suppose further that the corresponding integrator 151 is loaded with new data. The corresponding integrator 152, holding data from the sensor 10 obtained during the previous read event, is deactivated. After data sampling, the contents of the integrators 151 and 152 are subtracted by a subtracter circuit 190. The resulting difference is digitized by the A/D convertor 170. The digitized difference is stored in the memory 180. 32 multiplexing steps later the same sensor 10 is addressed again and the process is repeated with the integrators 151 and 152 interchanged. A net effect of this procedure is that data is high pass filtered with a cutoff frequency equal to the frequency with which the sensor 10 is addressed (e.g.: $1/(32 \times t_m)$). Thus, low frequency offsets are automatically canceled and correspondingly fewer bits are needed for representing the data. Also, virtually the entire multiplexing time interval $t_m$ is available for A/D conversion because data is stored in integrator A and B for each sensor 10 separately. It will be appreciated that, in other embodiment of the present invention, the integrators 151 and 152 may be replaced by different analogue memory devices such as for example charge coupled analogue shift registers or "bucket brigades".

Figure 13:
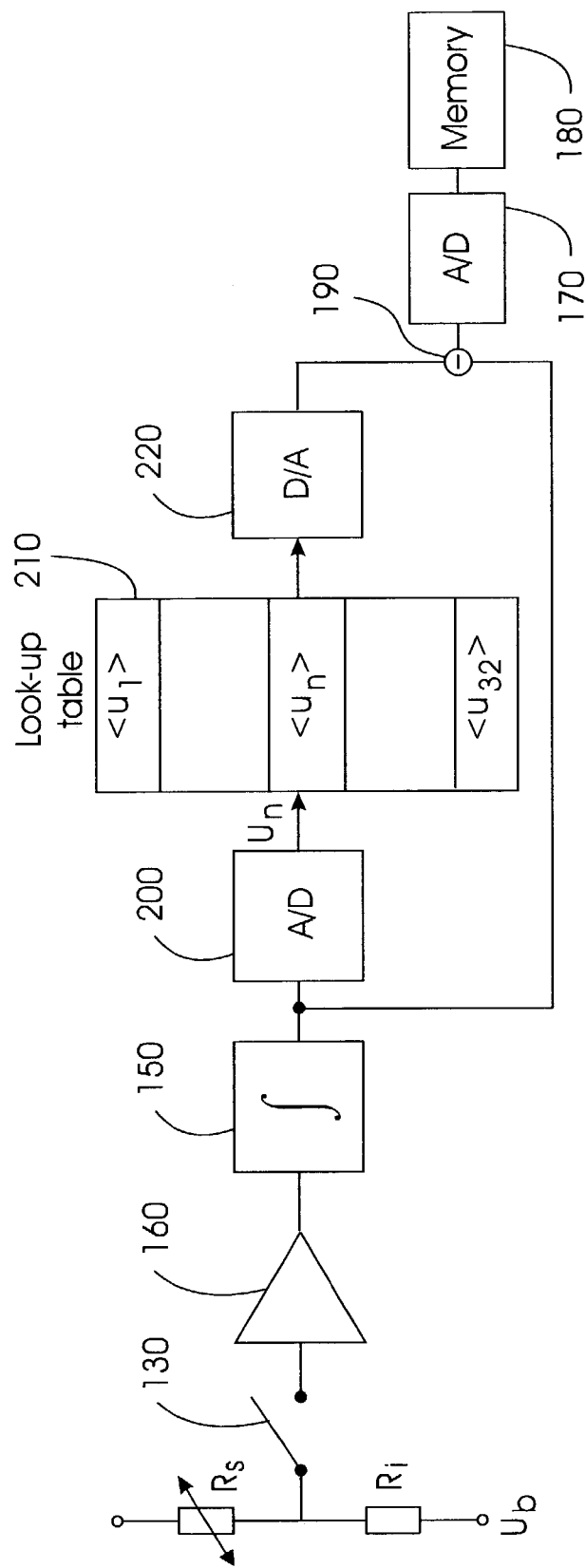
FIG. 13 is a block diagram of yet another detector for the data storage system.

Referring now to FIG. 13, in another embodiment of the present invention, the output of the integrator 150 is connected to another A/D convertor 200. The output of the A/D convertor 200 is connected to a look up table 210. The output of the look up table 210 is connected to a digital to analogue (D/A) convertor 220. The outputs of the D/A convertor 220 and the integrator 150 are connected to the subtracter 190. The output of the subtracter 190 is connected to the A/D convertor 170. The output of the A/D convertor 170 is connected to the memory 180. The concept here is to subtract a digitally generated compensation voltage from the measured signal. The compensation voltage is derived from the A/D convertor 200. The resolution of the A/D 200 convertor can be less than the dynamic range. Acceptable resolution may be obtained with, for example, 12 bits for a 32×32 array as hereinbefore described. A running average of the output of the A/D convertor 200 is stored for each sensor 10 in a look up table 210. The running average is then taken as the input parameter for the D/A convertor 220. The D/A convertor 220 generates an analogue offset voltage in response to the running average. The resolution of the D/A convertor 220 is preferably matched to that of the A/D convertor 210. The offset voltage is subtracted from the measured signal by the subtracter 190 to generate a difference signal. The difference signal is digitized by the A/D convertor 170 and stored in the memory 180. This arrangement advantageously permits a reduction of dynamic range in the A/D convertor 170 based on the accuracy with which the compensation voltage can be generated. In the example hereinbefore described, a resolution of 8 bits in the A/D convertor 170 suffices.

Figure 12:
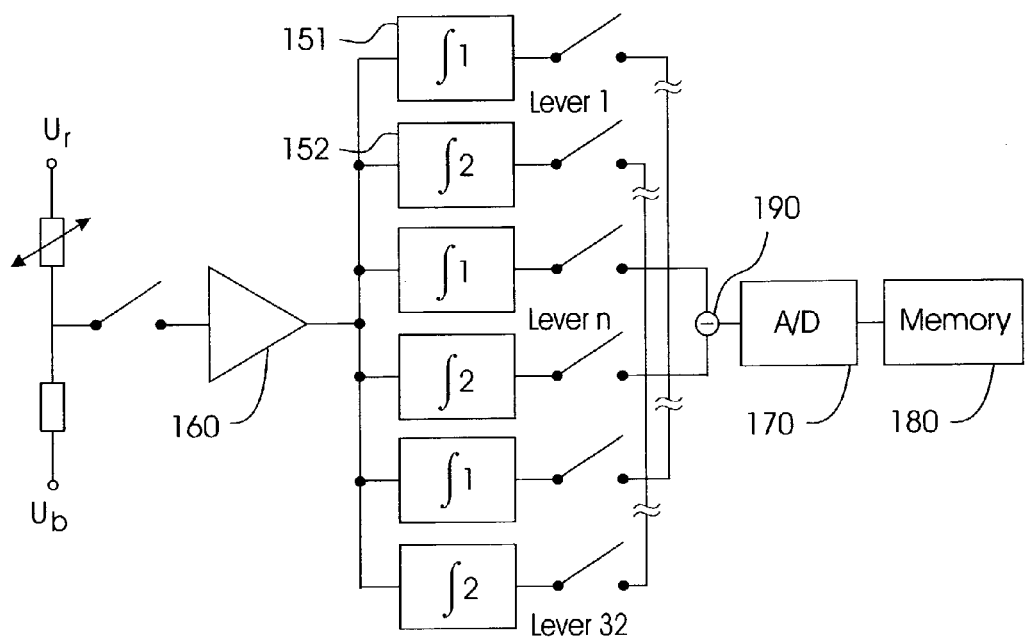
FIG. 12 is a block diagram of another detector for the data storage system.
Figure 14:
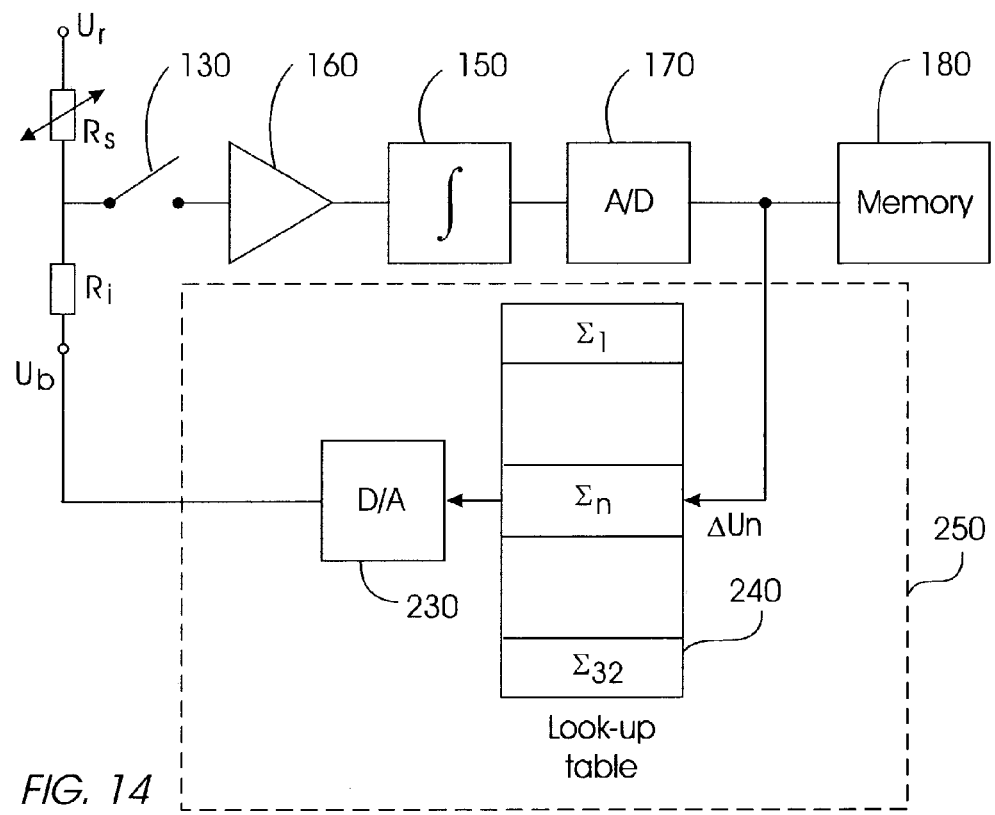
FIG. 14 is a block diagram of a further detector for the data storage system.

Referring now to FIG. 14, in a modification to the embodiment of the present invention hereinbefore described with reference to FIG. 12, the resistance bridge is balanced via a feedback loop 250 comprising a D/A convertor 230 having an output providing the balancing voltage $U_b$. A look up table 240 is connected to the output of the A/D convertor 170. The input to the D/A convertor 230 is connected to the look up table 240. In use, the feedback loop 250 adjusts the balancing voltage $U_b$. This advantageously permits elimination of low frequency noise and systematic errors. In operation, the value of the balancing voltage applicable to each sensor 10 is stored in the look up table 240. Suppose that a sensor 10 is activated for reading. The corresponding value for $U_b$ stored in the look up table 240 is applied to the bridge preferably via a programmable gain amplifier. The resistance of the sensor 10 is then sensed in the manner hereinbefore described and the digitized reading is stored in the memory 180. The balancing voltage is updated by subtracting a constant fraction of the measured signal from $U_b$. This provides an integrating feedback action. For a 32×32, array, the time constant of the integrating feedback action is determined by the multiplexing cycle time, $32 \times t_m$, and the overall feedback gain.

Figure 15:
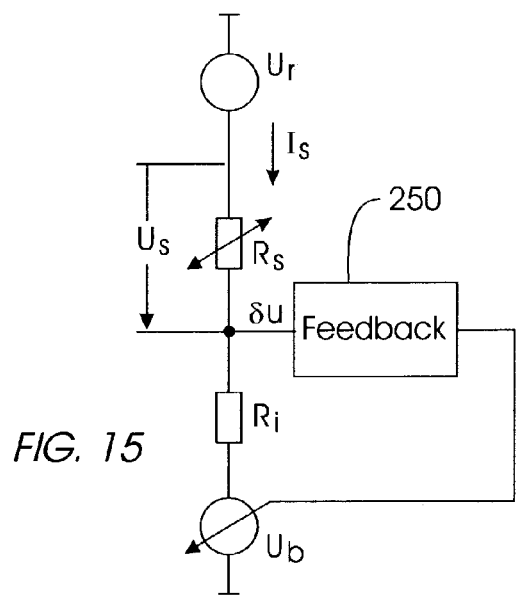
FIG. 15 is a simplified circuit diagram of the read out circuit illustrated in FIG. 14; and, FIG. 16 is a flow diagram of a method of reading a row of sensors according to the present invention.

In a sampled system, the temporal evolution of $U_b$ differs from that of a continuous case. In particular, oscillatory and eventually unstable solutions exist for sufficiently high gains. For example, consider a sampled linear system depicted in FIG. 15. The feedback transfer function is defined by the following equation in which discrete time steps are denoted by the argument k:

$$\Delta U_b(k) = U_b(k) - U_b(k-1) = -A\Delta U(k-1)$$

The closed loop step response function can be expressed in terms of the following iterative relationship, in which $R_s = dU_s/dI_s$ is the differential resistance of the sensor 10:

$$\Delta U_b(k) = (1 - A/(1 + R_f/R_s))\Delta U_b(k-1)$$

This effectively defines a geometric series which is convergent for:

$$0 < A/(1 + R_f/R_s) < 2$$

Note that the solution is oscillatory for values of scaled gain greater than 1 and that the oscillations decay increasingly slowly as the upper boundary value of 2 is approached. For values of the scaled gain factor between 0 and 1, the solution converges to the steady state approximately as an exponential with the following time constant, in which to is the sampling time interval:

$$T = t_0(1 + R_f/R_s)/A$$

Figure 16:
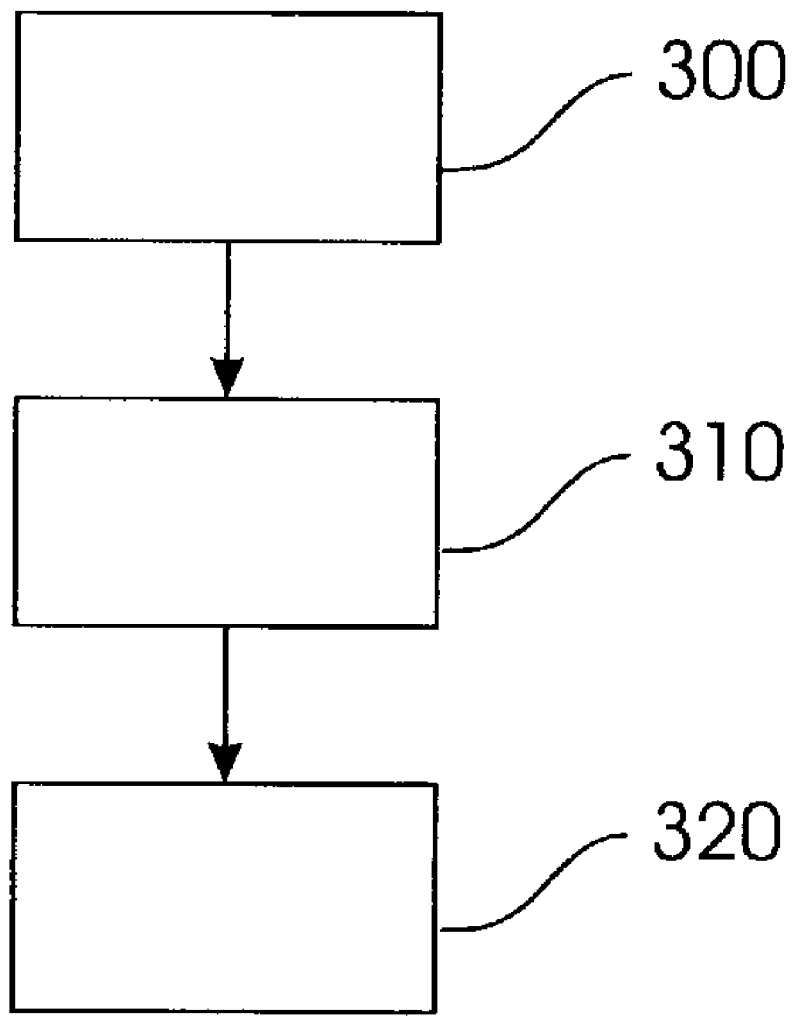

Referring to FIG. 16, in summary, methods have been hereinbefore for reading an array of sensors having a set of row conductors each connected to the sensors in a corresponding row of the array and a set of column conductors each connected to the sensors in a corresponding column of the array such that each sensor is connected between a row conductor and a column conductor. The methods comprise: for each row of sensors in the array, performing a read cycle comprising, at step 300, applying an activation pulse, to the corresponding row conductor to activate the sensors in the row, applying, at step 310, a reading pulse to the row conductor on expiry of a predetermined time interval from an edge of the activation pulse, and during the reading pulse, detecting at step 320, for each sensor in the row, a value dependent on a variable characteristic of that sensor. In preferred embodiments of the present invention hereinbefore described, the sensor are thermal resistance sensors, the activation pulse is a heating pulse to heat the sensors, and the variable characteristic is resistance. However it will be appreciated that the present invention is equally applicable to other types of sensors such as capacitive sensors, for example. The read cycle for at least one row is commenced during the predetermined time interval of the read cycle for another row. Examples of the present invention have been hereinbefore described with a reference to a data storage system. However, it will be appreciated that the present invention has many other applications. For example, the present invention is equally applicable to topography visualization. It will be appreciated that the present invention is especially suitable for semiconductor topography visualization for testing integrated circuits in a semiconductor device fabrication facility. Examples of the present invention have been hereinbefore described with reference to a 32×32 array of sensors. However, it will be appreciated that the present invention is equally applicable sensor arrays of different sizes and aspect ratios.

The invention claimed is:

1. A method for reading an array of thermal resistance sensors, the array having a set of row conductors each connected to the thermal resistance sensors in a corresponding row of the array and a set of column conductors each connected to the thermal resistance sensors in a corresponding column of the array such that each thermal resistance sensor is connected between a row conductor and a column conductor, the method comprising the steps of:

for each row of thermal resistance sensors in the array, performing a read cycle comprising applying an activation heating pulse to the corresponding row conductor to activate the thermal resistance sensors in the row, applying a reading pulse to the row conductor on expiry of a predetermined time interval from an edge of the activation heating pulse, and during the reading pulse, detecting, for each thermal resistance sensor in the row, a value dependent on a variable resistance characteristic of that thermal resistance sensor;

wherein the read cycle for at least one row is commenced during the predetermined time interval of the read cycle for another row and the amplitude of the heating pulse is greater than the amplitude of the reading pulse and the duration of the activation heating pulse is less than the duration of the reading pulse.

2. A method as claimed claim 1, including initiating the read cycles in row order.

3. A method as claimed in claim 2, wherein the reading pulses are applied alternately with the activation pulses.

4. A method as claimed in claim 2, wherein a group of the reading pulses are applied alternately with a corresponding group of the activation pulses.

5. A method as claimed in claim 2 including, for each sensor in the row, determining the difference between values detected during successive read cycles.

6. Apparatus for reading an array of sensors, the array having a set of row conductors each connected to the sensors in a corresponding row of the array and a set of column conductors each connected to the sensors in a corresponding column of the array such that each sensor is connected between a row conductor and a column conductor, the apparatus comprising:

for each row of sensors in the array, a signal source for, during a read cycle, applying an activation pulse to the corresponding row conductor to activate the sensors in the row and applying a reading pulse to the row conductor on expiry of a predetermined time interval from an edge of the activation pulse; and, for each sensor in the row, a detector connected to the corresponding column conductor for detecting, during the reading pulse, a value dependent on a variable characteristic of that sensor; said detector comprising a subtracter for determining, for each sensor in the row, the difference between values detected during successive read cycles;

wherein the read cycle for a plurality of rows is commenced during the predetermined time interval of the read cycle for another row.

7. Apparatus as claimed in claim 6, wherein the sensors are thermal resistance sensors, the activation pulse is a heating pulse to heat the sensors in the row, and the variable characteristic is resistance.

8. Apparatus as claimed in claim 7 wherein the detector comprises a balancing voltage source connected to the corresponding column conductor via a sense resistor and a sense amplifier for detecting voltage drop across the sense resistor.

9. Apparatus as claimed in claim 8, wherein the detector comprises an integrator for storing the output of the sense amplifier.

10. Apparatus as claimed in claim 9, wherein the detector comprises an analogue to digital convertor for generating a digital output indicative of the value stored in the integrator and a memory for storing the digital value.

11. Apparatus as claimed in claim 10, wherein the detector comprises a feedback loop for varying the output of the balancing voltage source in dependence on the output of the analogue to digital convertor.

12. Apparatus as claimed in claim 6, wherein the read cycles for a plurality of rows are commenced during the predetermined time interval of the read cycle for another row.

13. Apparatus as claimed in claim 12, wherein the signal source applies the reading pulses alternately with the activation pulses.

14. Apparatus as claimed in claim 12, wherein the signal source applies a group of the reading pulses alternately with a corresponding group of the activation pulses.

15. Apparatus as claimed in claim 12 wherein the detector comprises a subtracter for determining, for each sensor in the row, the difference between values detected during successive read cycles.

16. Apparatus as claimed in claim 15, wherein the detector comprises a memory for storing the values detected during successive read cycles.

17. Apparatus as claimed in claim 16, wherein the memory comprises an analogue integrator circuit.

18. Apparatus as claimed in claim 16, wherein the memory comprises a lookup table.

19. Apparatus as claimed in claim 6, wherein the signal source initiates the read cycles in row order.

20. Apparatus for reading an array of thermal resistance sensors, the array having a set of row conductors each connected to the thermal resistance sensors in a corresponding row of the array and a set of column conductors each connected to the thermal resistance sensors in a corresponding column of the array such that each thermal resistance sensor is connected between a row conductor and a column conductor, the apparatus comprising:

for each row of thermal resistance sensors in the array, a signal source for, during a read cycle, applying an activation pulse to the corresponding row conductor to activate the thermal resistance sensors in the row and applying a reading pulse to the row conductor on expiry of a predetermined time interval from an edge of the activation pulse; and, for each thermal resistance sensor in the row, a detector connected to the corresponding column conductor for detecting, during the reading pulse, a value dependent on a variable characteristic of that thermal resistance sensor; the detector comprises a balancing voltage source connected to the corresponding column conductor via a sense resistor and a sense amplifier for detecting voltage drop across a sense resistor;

wherein the read cycle for at least one row is commenced during the predetermined time interval of the read cycle for another row and wherein the activation pulse is a heating pulse to heat the sensors in the row, and the variable characteristic is resistance.

21. Apparatus as claimed in claim 20, wherein the detector comprises an integrator for storing the output of the sense amplifier.

22. Apparatus as claimed in claim 20, wherein the detector comprises an analogue to digital convertor for generating a digital output indicative of the value stored in the integrator and a memory for storing the digital value.

23. Apparatus as claimed in claim 22, wherein the detector comprises a feedback loop for varying the output of the balancing voltage source in dependence on the output of the analogue to digital convertor.

* * * * *